United States Patent [19]
Wada et al.

[11] Patent Number: 5,218,499
[45] Date of Patent: Jun. 8, 1993

[54] THIN-FILM MAGNETIC HEAD FOR PERPENDICULAR MAGNETIC RECORDING HAVING A MAGNETIC MEMBER WITH GROOVES CROSSING AT RIGHT ANGLES FORMED IN A PRINCIPAL SURFACE THEREOF

[75] Inventors: Toshiaki Wada, Takatsuki; Hideki Mine, Amagasaki; Junji Numazawa, Kawasaki; Naoto Hayashi, Zama, all of Japan

[73] Assignees: Sumitomo Special Metals Co., Ltd., Osaka; Nippon Hoso Kyokai, Tokyo, both of Japan

[21] Appl. No.: 713,107

[22] Filed: Jun. 11, 1991

[30] Foreign Application Priority Data

Jun. 21, 1990 [JP] Japan .................. 2-163344
Jun. 21, 1990 [JP] Japan .................. 2-163346

[51] Int. Cl.$^5$ .................. G11B 5/147; G11B 5/31; G11B 5/255
[52] U.S. Cl. .................. 360/126; 360/125; 360/122
[58] Field of Search .................. 360/126, 122, 125, 110

[56] References Cited

U.S. PATENT DOCUMENTS

| | | | |
|---|---|---|---|
| 4,353,102 | 10/1982 | Kanai et al. ........................ | 360/125 |
| 4,490,760 | 12/1984 | Kaminaka et al. .................. | 360/126 |
| 4,558,385 | 12/1985 | Kaminaka et al. .................. | 360/126 |
| 4,743,988 | 5/1988 | Sato et al. .......................... | 360/126 |
| 4,745,506 | 5/1988 | Nakamura et al. .................. | 360/122 |
| 4,777,074 | 10/1988 | Wada et al. ........................ | 360/122 |
| 4,819,111 | 4/1989 | Keel et al. .......................... | 360/122 |
| 4,896,417 | 1/1990 | Sawada et al. ..................... | 360/125 |
| 4,980,788 | 12/1990 | Yamada et al. ..................... | 360/126 |
| 4,984,118 | 1/1991 | Springer ............................ | 360/122 |

Primary Examiner—Stuart S. Levy
Assistant Examiner—Craig A. Renner
Attorney, Agent, or Firm—Watson, Cole, Grindle & Watson

[57] ABSTRACT

A thin film magnetic head for perpendicular magnetic recording includes a magnetic member lying on a wear-resistant substrate of a non-magnetic material and defining a return path for magnetic flux. The magnetic member has a main groove formed in one of its principal surfaces in parallel to a sliding surface adapted to face a magnetic recording medium, and a narrow groove formed in the same principal surface and crossing the main groove at right angles thereto. The main and narrow grooves are filled with a non-magnetic material. The magnetic member carries thereon a laminate formed immediately above the intersection of the main and narrow grooves, and consisting at least of a thin-film conductor coil, an interlayer insulating film, a main pole film and a head-protecting film which are formed one upon another. The narrow groove has a width which is larger than that of the main pole film. The magnetic member is connected to the main pole film through a via hole portion. The magnetic member and the laminate have an exposed surface defining the sliding surface, and the magnetic member is exposed in the vicinity of the main pole film.

19 Claims, 7 Drawing Sheets

PRIOR ART

Fig. 7 b

PRIOR ART

THIN-FILM MAGNETIC HEAD FOR PERPENDICULAR MAGNETIC RECORDING HAVING A MAGNETIC MEMBER WITH GROOVES CROSSING AT RIGHT ANGLES FORMED IN A PRINCIPAL SURFACE THEREOF

BACKGROUND OF THE INVENTION

1. Field of the Invention

This invention relates to thin-film heads which are used for the perpendicular magnetic recording and reproduction of data or information in apparatus such as a computer, tape or videotape recorder.

2. Description of the Prior Art

Thin-film magnetic heads for perpendicular magnetic recording are generally suitable for use in making high density magnetic recordings since they form a very small magnetic circuits. They include a magnetic thin film having a high permeability and a high saturation magnetic flux density. As a thin-film magnetic head is made by a manufacturing process based on semiconductor technology, it can be made at a low cost, yet it has a high degree of dimensional accuracy. Therefore, the thin-film head is expected to become more popular than any other type of perpendicular magnetic head.

Figure 7:
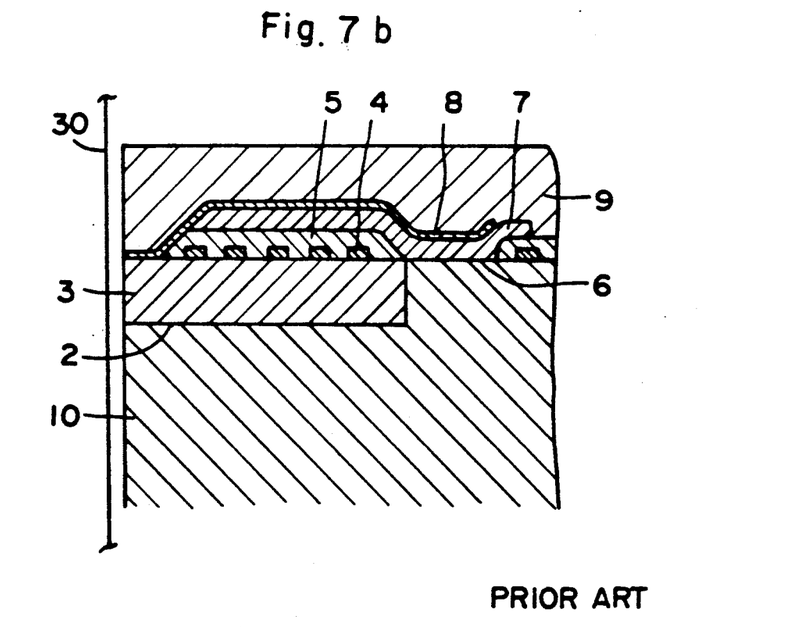
FIG. 7(a) is a schematic front elevational view of the conventional thin-film magnetic head.
FIG. 7(b) is a schematic vertical sectional view of the head shown in FIG. 7(a).
Figure 7A:
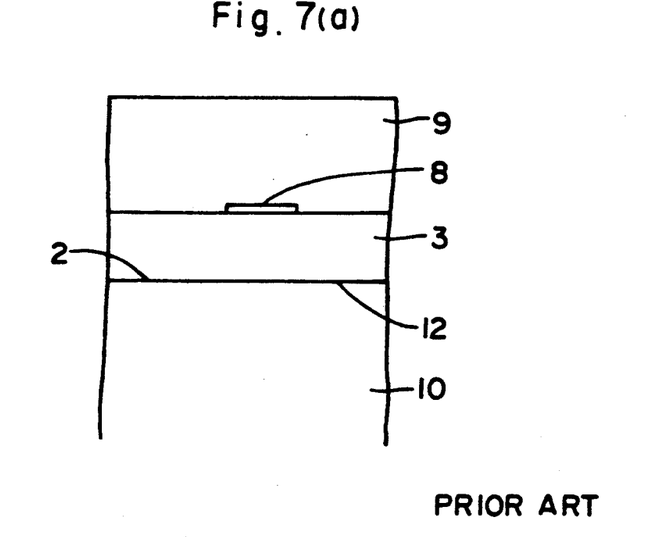

Reference is made to FIGS. 7(a) and 7(b) of the accompanying drawings which show by way of example a known thin-film magnetic head for perpendicular magnetic recording, and more particularly, the transducer portion thereof that faces a recording medium. The head comprises a magnetic member 10 formed from, e.g., soft ferrite, a non-magnetic material 3 laid on it and defining a gap layer, a thin-film conductor coil 4 on the material 10 and 3, an insulating layer 5 covering the coil 4, a thick-film magnetic layer 7 formed on the insulating layer 5 of, e.g., a Permalloy, Sendust, or amorphous cobalt alloy, a main pole film 8 formed on the layer 7 which prevents the magnetic saturation of the film 8 during recording, and a protective film 9 formed on the film 8 for protecting the head.

The laminated assembly as hereinabove described has an exposed surface adapted to face a recording medium 30. The magnetic member 10 defines a return path for magnetic flux to the recording medium 30 and has a groove 2 filled with the non-magnetic material 3. The nonmagnetic material 3 and the magnetic member 10 have, however, a boundary plane 12 which is parallel to the main pole film 8, as shown in FIG. 7(a). Therefore, the magnetic flux produced by the main pole returns only to that portion of the medium which faces the main pole, and the head fails to produce a satisfactorily large output for reproduction.

We have previously found that if a laminated film assembly is formed immediately above an intersection of grooves crossing each other at right angles, the return of magnetic flux not only to the area facing the main pole film is achieved, but also along the track width, and thereby an improved output for reproduction is obtained (see Japanese Patent Application No. 50292/1990).

However, such a thin-film head is still unsatisfactory because the magnetic member for the return path is formed from soft ferrite of the Ni-Zn or Mn-Zn series and is too low in hardness to have the necessary resistance to wear caused by the magnetic recording medium which is brought into sliding contact with it.

SUMMARY OF THE INVENTION

Under these circumstances, it is an object of this invention to provide a thin-film magnetic head for perpendicular magnetic recording which not only has improved reproducing output, but also has improved wear resistance.

We have found that an improved magnetic member for a thin-film head can be obtained if a substrate of a magnetic material is laminated on a substrate of a non-magnetic material having a high wear resistance by interposing, e.g., glass between the two substrates, or if a thin film of a magnetic material is formed on the substrate of a non-magnetic material by a vapor-phase film-forming process, and if grooves crossing each other at right angles are formed in the magnetic material on the non-magnetic substrate and the other films or layers forming the head are laminated immediately above the intersection of the grooves. The resulting laminate has an exposed surface which is for the greater part composed of the non-magnetic material and has, therefore, a greatly improved wear resistance. The grooves made as hereinabove described enable the return of magnetic flux not only to the area facing the main pole film, but also along the track width, and thereby provide an improved output for reproduction.

We have also found that a still improved wear resistance can be achieved if another wear-resistant substrate of a non-magnetic material is bonded to a protective film normally defining the uppermost layer of the thin-film head.

Thus, the object of this invention as hereinabove stated is attained by a thin-film head comprising a magnetic member lying on a wear-resistant substrate of a non-magnetic material and defining a return path, the magnetic member having a main groove formed in one of its principal surfaces in parallel to a sliding surface adapted to face a magnetic recording medium, and a narrow groove formed in the same principal surface and crossing the main groove at right angles thereto, the main and narrow grooves being filled with a non-magnetic material, and a laminate formed immediately above the intersection of the main and narrow grooves. The laminate consist of at least a thin-film conductor coil, an interlayer insulating film, a main pole film and a head-protecting film which are formed one upon another. The narrow groove has a width which is larger than that of the main pole film, the magnetic member is connected to the main pole film through a via hole portion, the magnetic member and the laminate have an exposed surface defining the sliding surface, and the magnetic member is exposed in the vicinity of the main pole film.

According to a preferred aspect of this invention, the head further includes another wear-resistant substrate of a non-magnetic material bonded to the outer surface of the head-protecting film.

These and other features and advantages of this invention will become more apparent from the following description and the accompanying drawings.

DETAILED DESCRIPTION OF THE INVENTION

The thin-film magnetic head of this invention is saliently featured by a magnetic member formed on a wear-resistant substrate of a non-magnetic material, and defining a return path for magnetic flux. Moreover, the head has a sliding surface for a magnetic recording medium in which the magnetic member is exposed not only in its portion facing a main pole film, but also in its portions extending along the track width and interrupted by a non-magnetic material filling a groove.

Figure 2A:
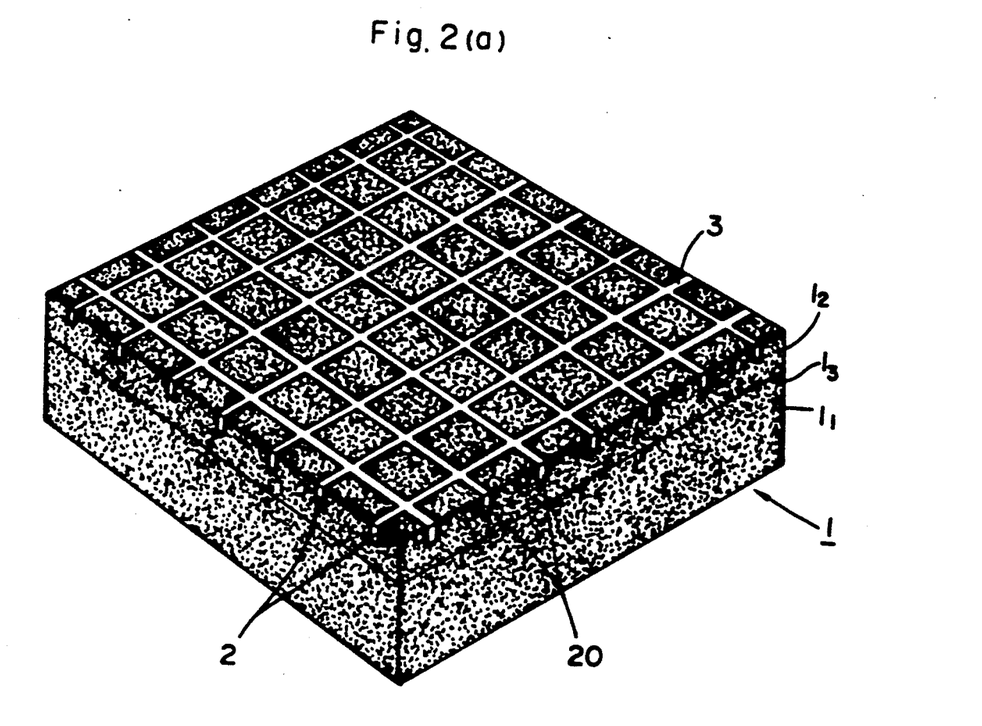
FIG. 2(a) is a perspective view of one form of grooved substrate which can be used to make the head of this invention.
Figure 2B:
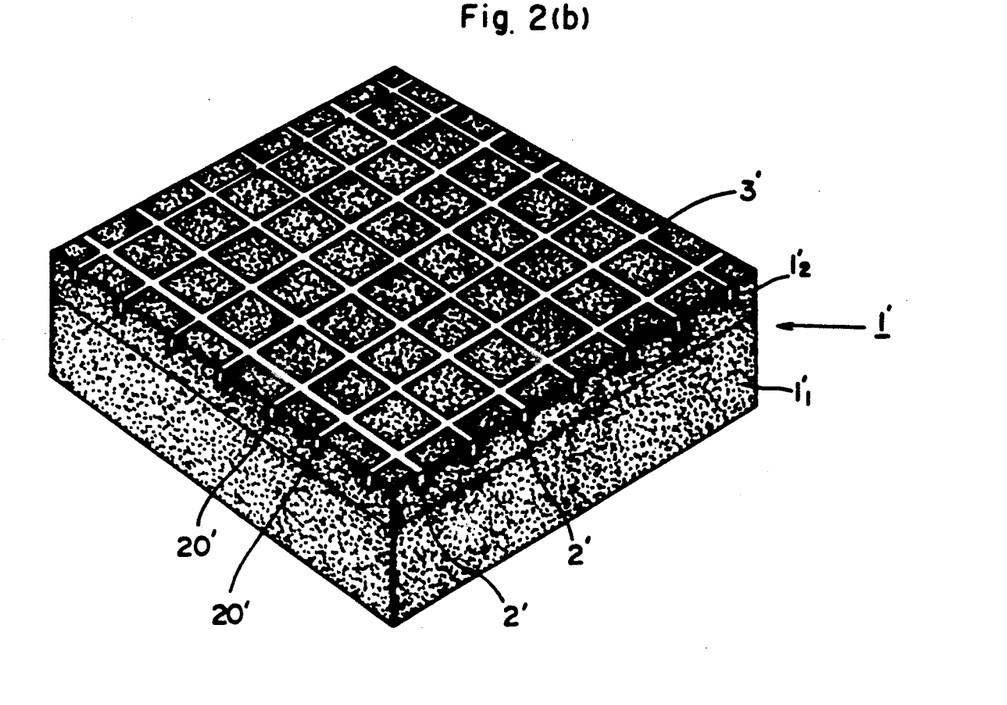
FIG. 2(b) is a view similar to FIG. 2(a), but showing another form of grooved substrate.

FIGS. 2(a) and 2(b) show by way of example two forms of grooved substrate assembly 1 and 1' which can alternatively be used to ensure the easy and efficient manufacture of the thin-film heads according to this invention.

The grooved substrate assembly 1 shown in FIG. 2(a) comprises a wear-resistant substrate 1 of a non-magnetic material, such as $ZrO_2$ or $Al_2O_3$ ceramics, a substrate $1_2$ of a magnetic material, such as Ni-Zn or Mn-Zn ferrite, and a glass layer $1_3$ interposed therebetween. The grooved substrate assembly 1' shown in FIG. 2(b) comprises a wear-resistant substrate $1_1'$ of a non-magnetic material, which may be equal to the substrate $1_1$ shown in FIG. 2(a), and a thin film $1_2'$ of a magnetic material, such as a Permalloy, Sendust, or amorphous cobalt alloy, or Ni-Zn or Mn-Zn ferrite, formed on the non-magnetic substrate $1_1'$ by, for example, a vapor-phase film-forming process.

The magnetic substrate $1_2$, or the magnetic film $1_2$, has a plurality of parallel main grooves 2, or 2' each having a flat bottom, and a plurality of parallel narrow grooves 20 or 20' crossing the main grooves 2 or 2' at right angles thereto. The grooves are all filled with a non-magnetic material 3 or 3', such as glass, $SiO_2$, $Al_2O_3$ or barium titanate. Each main groove 2 or 2' is provided to prevent the leakage of magnetic flux between the magnetic member defining a return path and a main pole film. Each narrow groove 20 or 20' has a width which is slightly (0.5 to 50 microns) larger than the track width, and defines a gap layer.

Description will now be made of a process for manufacturing the thin-film magnetic head of this invention with reference to FIGS. 2(a), 2(b) and 3(a) to 3(f). The following is also a detailed description of the head according to this invention.

(1) The first step is to prepare the grooved substrate assembly 1 or 1' which has already been described with reference to FIGS. 2(a) or 2(b). The main grooves 2 or 2' and the narrow grooves 20 or 20' are formed in the upper or exposed principal surface of the magnetic substrate $1_2$, or the magnetic film $1_2'$, which has been formed by, for example, sputtering. The grooves are all filled with a molten or sputtered non-magnetic material 3 or 3'. The grooved surface of the magnetic substrate $1_2$, or the magnetic film $1_2'$, is mechanochemically polished.

The following description is of the process in which the substrate assembly 1 as shown in FIG. 2(a) is employed.

Figure 3A:
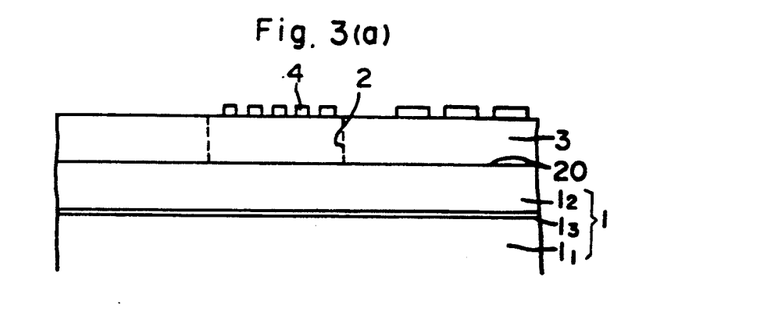
FIGS. 3(a) to 3(f) are a series of views illustrating a process for making the head of this invention.

(2) A thin-film conductor coil 4 is formed from, e.g., gold, copper, chromium or aluminum by sputtering or vacuum deposition on the polished surface of the magnetic substrate $1_2$ of the grooved substrate assembly 1 [FIG. 3(a)].

An insulating layer is formed on the substrate $1_2$ prior to the formation of the coil 4 if the substrate $1_2$ is of Mn-Zn ferrite.

Figure 3B:
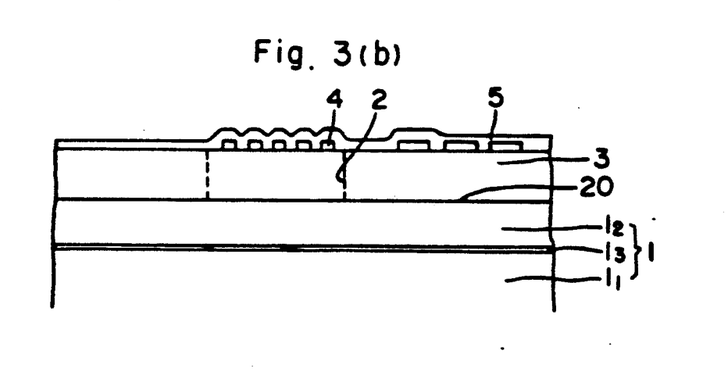

(3) An interlayer insulating film 5 is formed over the coil 4 from an inorganic oxide, such as $SiO_2$ or $Al_2O_3$, or an organic material, such as polyimide, to establish electrical insulation between the coil 4 and a thick main pole film 7 which will later be formed [FIG. 3(b)].

(4) As the insulating film 5 has an uneven surface due to the underlying coil 4, it is smoothed to a roughness not exceeding 500 Å by precision polishing, as with a diamond, or by etchback.

Figure 3C:
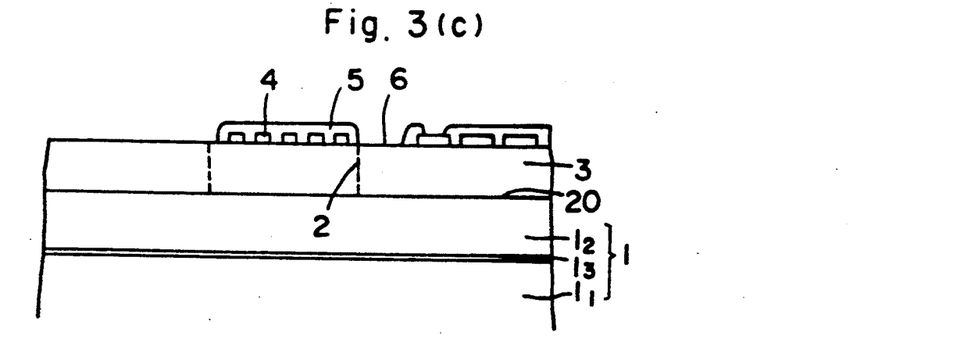

(5) A via hole portion 6, through which the thick main pole film 7 will be connected to the magnetic substrate $1_2$, is formed in the interlayer insulating film 5 by, e.g., ionic or chemical etching [FIG. 3c)].

Figures 3D, 3E:
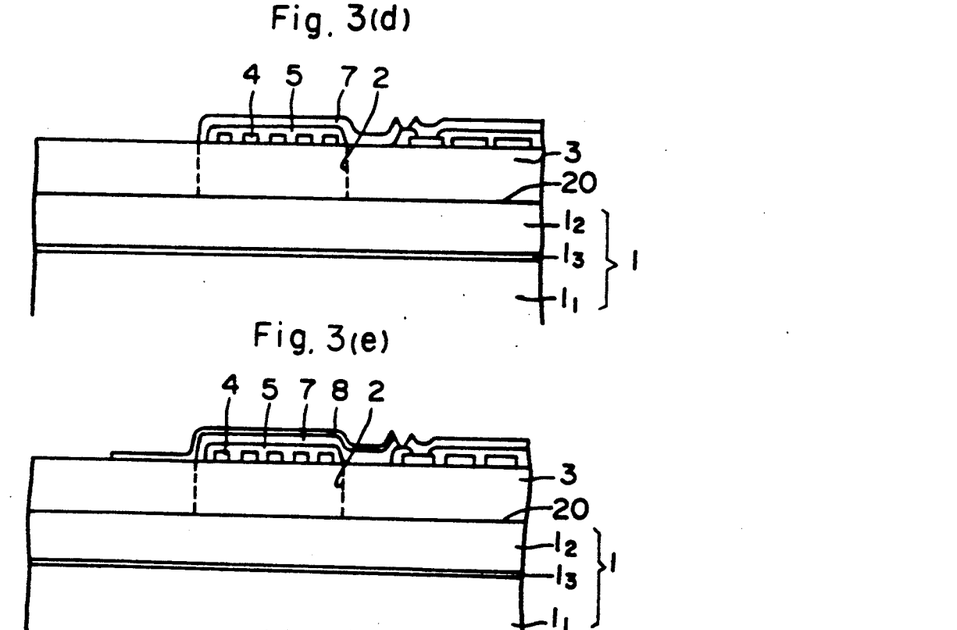

(6) The thick main pole film 7 is formed from, e.g., an iron alloy such as a Permallol or Sendust, or an amorphous cobalt alloy by, e.g.,m sputtering, vapor deposition, or plating in a specific pattern on the surface of the interlayer insulating film 5 and the surface of the magnetic substrate $1_2$ which has been exposed through the via hole portion 6 [FIG. 3(d)].

(7) A main pole film 8 is formed by, e.g., sputtering, vapor deposition, or plating in a specific pattern on the thick main pole film 7 [FIG. 3(e)].

Figure 3F:
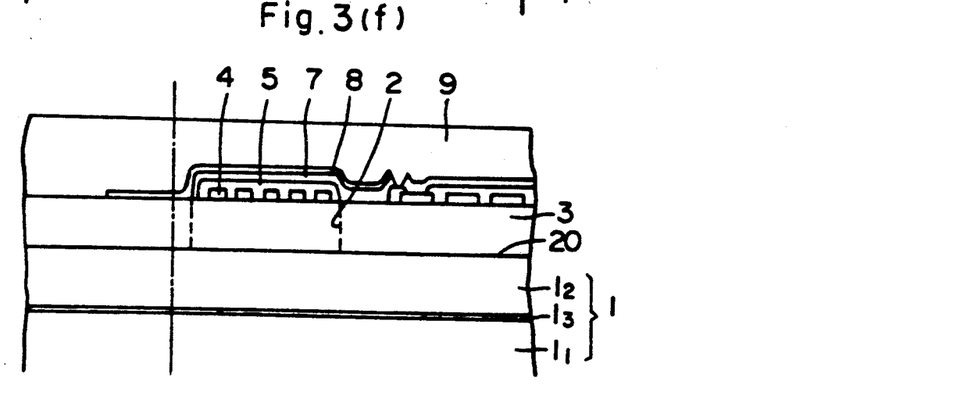

(8) A head-protecting film 9 is formed on the main pole films 7 and 8 (FIG. 3(f)).

A wear-resistant layer of a non-magnetic material, such as $ZrO_2$ or $Al_2O_3$, may optionally be bonded to the head-protecting film 9, e.g., a layer of glass, if a still higher wear resistance is required.

Figure 1A:
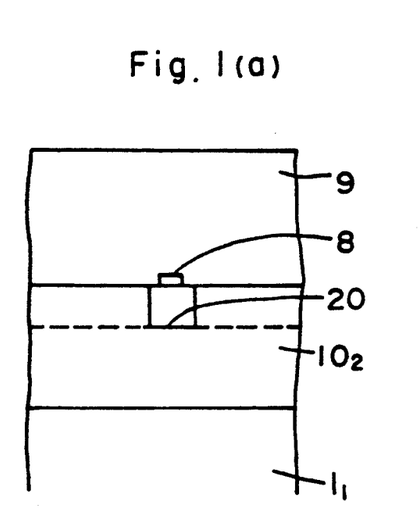
FIG. 1(a) is a schematic front elevational view of a thin-film magnetic head embodying this invention.
Figure 1B:
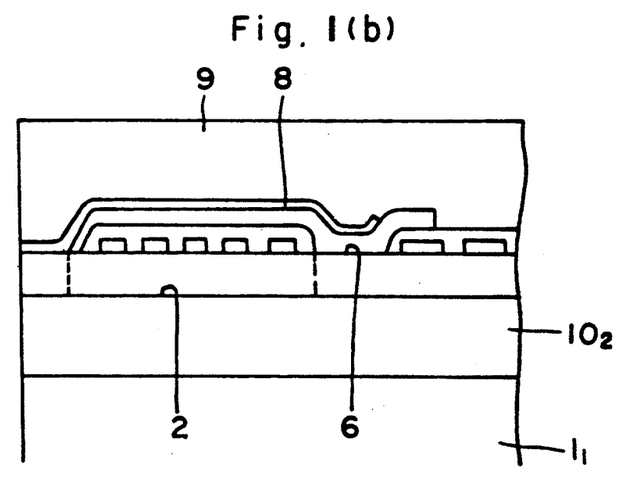
FIG. 1(b) is a schematic vertical sectional view of the head shown in FIG. 1(a)
Figure 1C:
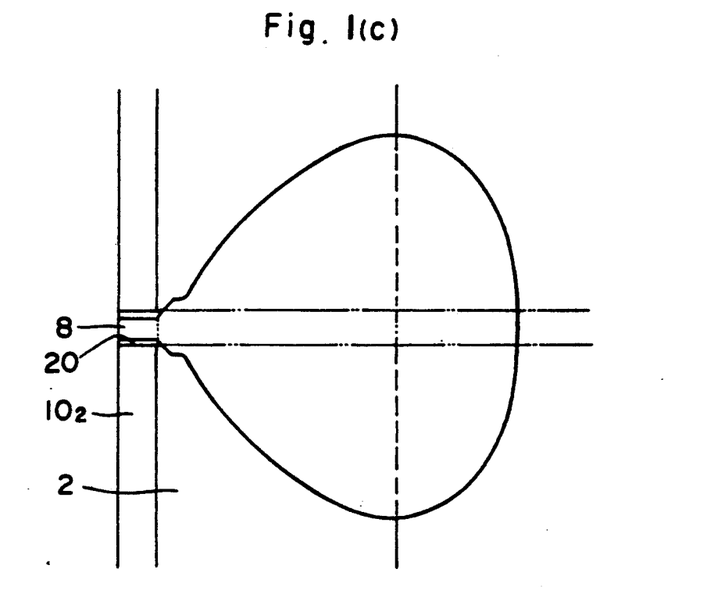
FIG. 1(c) is a schematic horizontal sectional view of the head shown in FIGS. 1(a) and 1(b)

(9) The whole assembly is appropriately cut across the main and narrow grooves 2 and 20, and each chip thereby obtained is finished in dimensions and shape, whereby a thin-film magnetic head is obtained. The head has a sliding surface for a magnetic recording medium in which a magnetic member $10_2$, which has been formed from the magnetic substrate $1_2$, has a groove 20 exposed in a specific relation in shape and dimensions to the main pole film 8, as shown in FIGS. 1(a) and 1(b).

The non-magnetic substrate $1_1$ or $1_1'$ may be formed from $ZrO_2$ or $Al_2O_3$, or any other non-magnetic material having a high degree of wear resistance.

The magnetic substrate $1_2$ as shown in FIG. 2(a) may be formed from Ni-Zn or Mn-Zn ferrite, or any other known magnetic material. Each main groove 2 preferably has a width which is equal to the distance between the via hole portion 6 and the end of the thick main pole film 7 remote from the via hole portion 6, and a depth of 2 to 100 microns. Each narrow groove 20 preferably has a width which is larger by 0.5 to 50 microns, and more preferably by 1 to 20 microns, than the width of the main pole film 8, and a depth of 0.5 to 50 microns.

The magnetic film $1_2'$ as shown in FIG. 2(b) may be any film formed by any known thin-film forming process, such as sputtering or vapor deposition, from a Permalloy, Sendust, or amorphous cobalt alloy, or Ni-Zn or Mn-Zn ferrite, or any other known magnetic material selected so as to satisfy the magnetic properties required of the head, if it has a thickness not exceeding 50 microns. Each main groove 2' preferably has a width which is equal to the distance between the via hole portion 6 and the end of the thick main pole film 7 remote from the via hole portion 6 when the head is made, and a depth of 2 to 30 microns. Each narrow groove 20' preferably has a width which is larger by 0.5 to 50 microns, and more preferably by 1 to 20 microns, than the width of the main pole film 8, and a depth of 0.5 to 30 microns, and more preferably, 1 to 5 microns.

The thin-film magnetic head as hereinabove described exhibits improved recording and reproducing characteristics, since the magnetic flux produced by the main pole film is allowed to return not only to the area facing it, but also to the area extending along the track width. As the magnetic film forming the magnetic member defining a return path is easy to form by a vapor-phase film-forming process, and as the grooves forming an important feature of this invention are easy to make by etching, the head of this invention is very easy to manufacture, and has a very small thickness and thereby a greatly improved wear resistance.

The invention will now, be described more specifically with reference to a few examples thereof.

EXAMPLE 1

A substrate assembly was prepared by bonding a substrate of Ni-Zn ferrite having a precisely finished surface to the precisely finished surface of a substrate of $ZrO_2$ with a layer of boronsilicate glass having a thickness of 10 microns. A plurality of main grooves, each having a width of 0.20 mm, a depth of 0.030 mm and a length of 50 mm, were formed by machining in the surface of the ferrite substrate. A plurality of narrow grooves, each having a width of 0.06 mm, a depth of 0.030 mm and a length of 50 mm, were likewise formed so as to cross the main grooves at right angles thereto. The grooves were filled with $Al_2O_3$ so that the alumina might not form more than one bubble having a diameter of one micron or above per cubic millimeter. The surface was mechanochemically polished.

A thin-film conductor coil was formed from copper by sputtering in a specific pattern on the polished surface of the ferrite substrate. An interlayer insulating film was formed from a polyimide resin over the coil, and was smoothed to an appropriate surface roughness by etchback.

A thick main pole film was formed from an amorphous cobalt alloy by sputtering in a specific pattern on the surface of the insulating film and the exposed surface of the ferrite substrate. A thin main pole film was formed from an amorphous cobalt alloy by sputtering in a specific pattern on the thick main pole film. A head protecting film was, then, formed thereon from $Al_2O_3$.

The whole assembly was appropriately cut, shaped and sized to give a plurality of thin-film heads, each having a sliding surface for a recording medium in which a magnetic member defining a return path had a groove exposed in a specific relation in shape and dimensions to the exposed main pole film.

For the sake of comparison, a plurality of thin-film heads were manufactured by following the same process, but employing a substrate of Ni-Zn ferrite having grooves, each having a width of 0.3 mm and a depth of 0.025 mm, filled with glass, and defining a gap layer.

Figure 4:
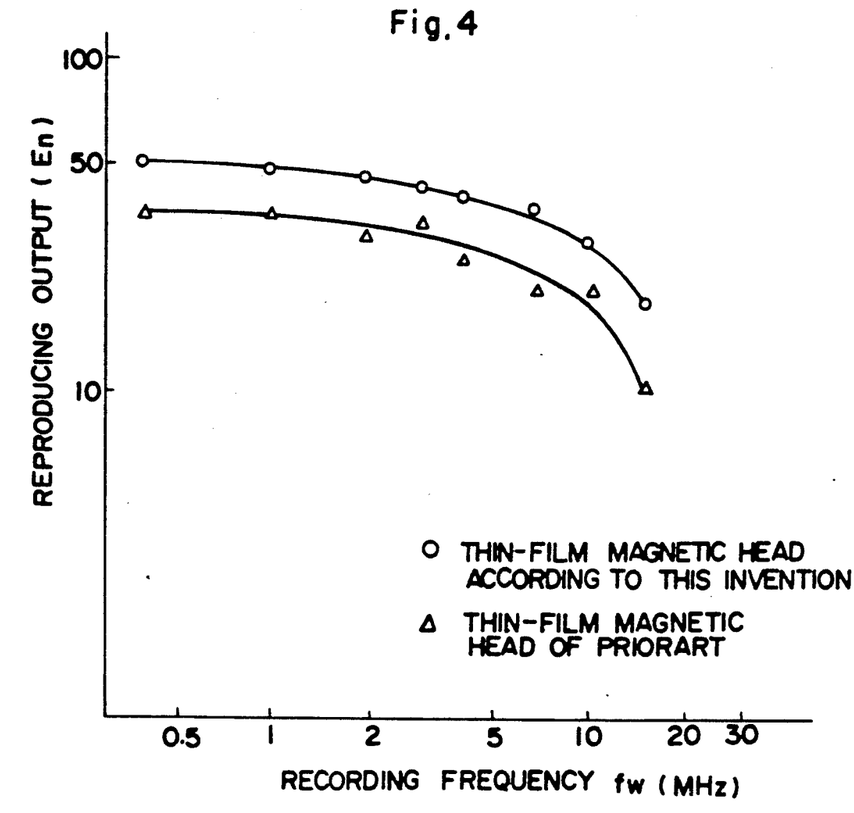
FIG. 4 is a graph showing the output for reproduction as achieved by one specific form of the head embodying this invention, in comparison with the output as obtained by a conventional thin-film magnetic head.

The two different types of heads having differently shaped grooves were evaluated for reproduction output characteristics on a self-recording and reproducing basis under the conditions which will hereinafter be set forth. The results are shown in FIG. 4. As is obvious therefrom, the heads of this invention exhibited very good output characteristics.

Figure 5:
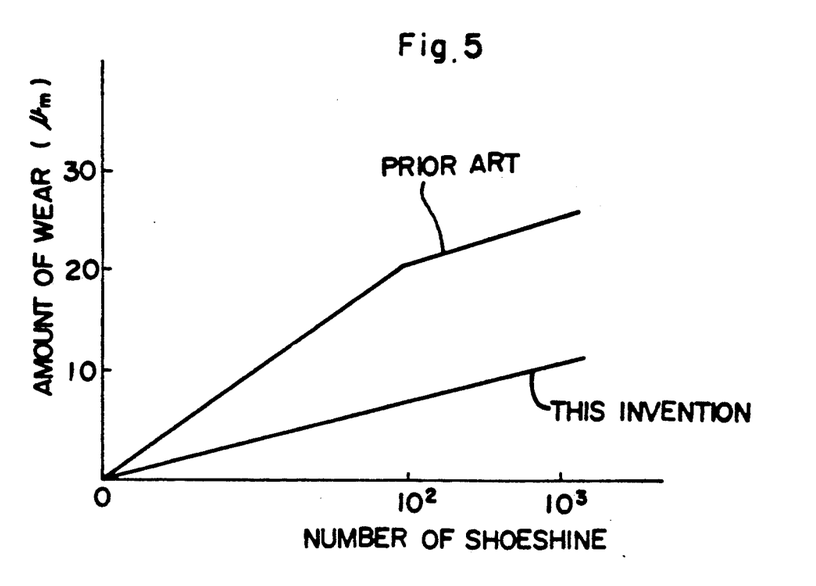
FIG. 5 is a graph showing the amount of wear as found on the head of this invention in relation to the number of shoeshine sliding movements to which it was subjected, as well as the results of the same tests conducted on the conventional head.

They were also evaluated for wear resistance by the shoeshine sliding tests conducted under the conditions which will hereinafter be set forth. The results are shown in FIG. 5. As is obvious therefrom, the heads of this invention exhibited a greatly improved wear resistance apparently owing to the substrate assembly which had been employed as hereinabove described.

The following is a summary of data concerning the heads, the conditions employed for preparing the heads, and the materials and conditions employed for testing the heads which have not hereinabove been set forth:

Recording Medium

A medium having a two-layer film composed of CoCr and NiFe, a perpendicular coercive force, $H_c$, of 500 Oe, and a protective film of carbon was used for testing each head.

Heads

All of the heads had a track width of 50 microns.

Relative Velocity 7.5 m/sec.

Rotating Speed 1800 rpm.

| Conditions for Mechanochemical Polishing: | |
|---|---|
| Machine: | A 15-inch mechanochemical polishing machine; |
| Polisher: | A non-woven fabric; |
| Powder: | A powder of MgO having a particle diameter not exceeding 0.02 micron; |
| Rotating speed: | 20 rpm; |
| Pressure: | 0.5 kg/mm$^2$. |
| Conditions for Diamond Polishing: | |
| Machine: | A 15-inch single-surface lapping machine; |
| Polisher: | A disk of tin; |
| Diamond: | Particles having a diameter of 0.5 to 1.0 micron; |
| Rotating speed: | 30 rpm; |
| Pressure: | 0.5 kg/mm$^2$. |
| Conditions for Reproducing Output Tests: | |
| Disk rotating speed: | 1800 rpm; |
| Medium: | CoCr/NiFe; |
| Recording frequency: | 0.5 to 20 MHz; |
| Recording current: | 20 mAp-p; |
| Relative velocity: | v = 7.5 m/sec. |
| Conditions for Shoeshine Sliding Tests: | |
| Test tape: | CrO$_2$ tape; |

-continued

| Tape speed: | 3.2 m/sec.; |
| Tension on tape: | 250 g. |

EXAMPLE 2

A substrate assembly was prepared by forming a thin film of soft ferrite having a thickness of 20 microns by sputtering on the precisely finished surface of a substrate of $ZrO_2$. A plurality of main grooves, each having a width of 0.15 mm, a depth of 0.012 mm and a length of 50 mm, were formed in the ferrite film of the substrate by photolithographic etching, and a plurality of narrow grooves, each having a width of 0.075 mm, a depth of 0.012 mm and a length of 50 mm, were likewise formed so as to cross the main grooves at right angles thereto. The grooves were filled with $Al_2O_3$ so that the alumina might not form more than one bubble having a diameter of one micron or above per cubic millimeter. The surface of the film, including the alumina filling the grooves, was mechanochemically polished.

A thin-film conductor coil was formed from copper by sputtering in a specific pattern on the polished surface. An interlayer insulating film was formed from a polyimide resin over the coil, and its surface was smoothed to an appropriate roughness by etchback.

A thick main pole film was formed from an amorphous cobalt alloy by sputtering in a specific pattern on the surface of the insulating film and the exposed surface of the ferrite film. A thin main pole film was formed from an amorphous cobalt alloy by sputtering in a specific pattern on the thick main pole film. A head-protecting film was, then, formed thereor from $Al_2O_3$.

The whole assembly was appropriately cut, shaped and sized to give a plurality of thin-film heads, each having a sliding surface for a recording medium in which a magnetic member defining a return path had a groove exposed in a specific relation in shape and dimensions to the exposed main pole film.

For the sake of comparison, a plurality of thin-film heads were manufactured by following the same process, but employing a substrate assembly comprising a substrate of Ni-Zn ferrite having a thickness of 100 microns and bonded to a substrate of $ZrO_2$ with a layer of glass.

Figure 6:
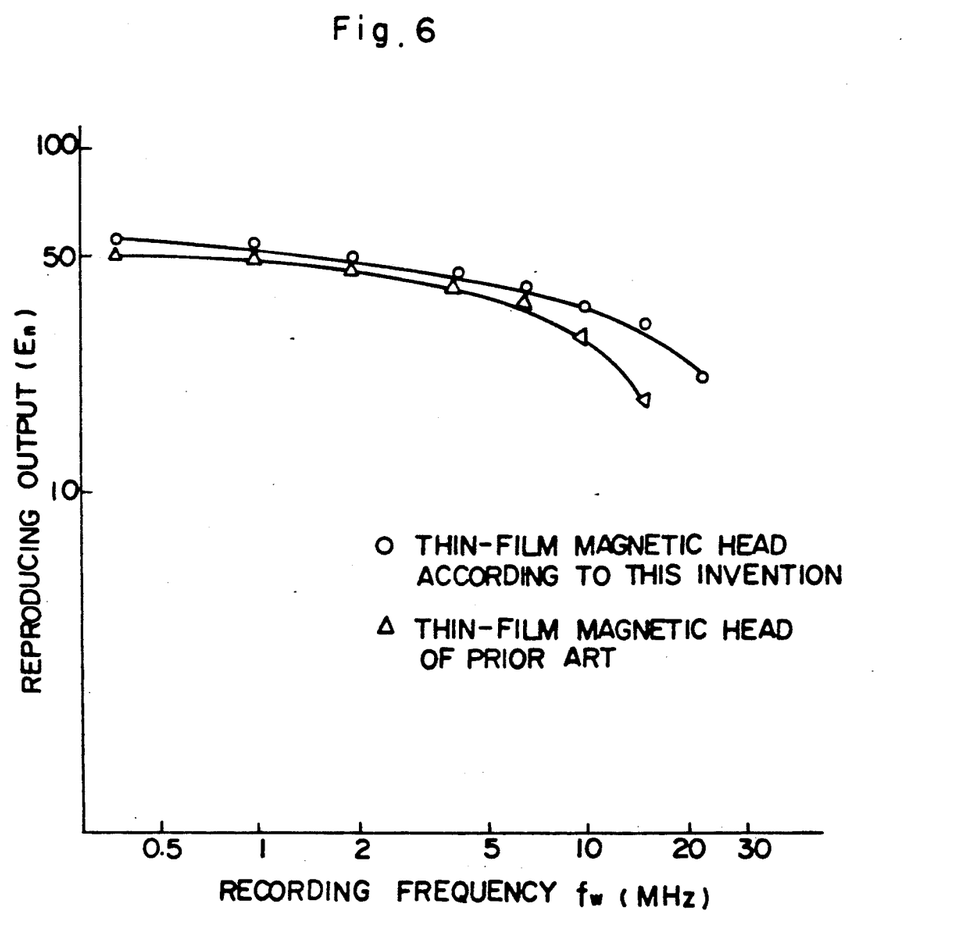
FIG. 6 is a graph showing the output for reproduction as achieved by another specific form of the head embodying this invention, in comparison with the results obtained by a comparative head.

The two different types of heads having differently shaped grooves were evaluated for reproduction output characteristics on a self-recording and reproducing basis under the same conditions as those which had been employed in EXAMPLE 1. The results are shown in FIG. 6. As is obvious therefrom, the heads of this invention exhibited very good output characteristics.

They were also evaluated for wear resistance by the shoeshine sliding tests conducted under the same conditions as those which had been employed in EXAMPLE 1. The test results were obtained as a difference in level between the non-magnetic material and the ferrite. None of the heads according to this invention showed any difference exceeding 0.03 micron, while the comparative heads showed a difference of at least 0.1 micron. These results confirm the outstanding wear resistance of the heads according to this invention.

What is claimed is:

1. A thin-film magnetic head for perpendicular magnetic recording comprising:
    a magnetic member lying on a wear-resistant substrate of a non-magnetic material and defining a return path, said member having a main groove formed in one of its principal surfaces in parallel to a sliding surface adapted to face a magnetic recording medium, and a narrow groove formed in said one principal surface and crossing said main groove at right angles thereto, said main and narrow grooves being filled with a non-magnetic material; and
    a laminate formed immediately above the intersection of said main and narrow grooves, and consisting at least of a thin-film conductor coil, an interlayer insulating film, a main pole film and a head protecting film which are formed one upon another, said narrow groove having a width which is larger than that of said main pole film, said magnetic member being connected to said main pole film through a via hole portion, said member and said laminate having an exposed surface defining said sliding surface, and said member being exposed in the vicinity of said main pole film.

2. A head as set forth in claim 1, wherein said laminate further includes a wear-resistant substrate of a non-magnetic material bonded to an outer surface of said head protecting film with a layer of glass.

3. A head as set forth in claim 1, wherein said substrate is of a wear-resistant material selected from the group consisting of $Al_2O_3$ and $ZrO_2$ ceramics.

4. A head as set forth in claim 1, wherein said non-magnetic material filling said main and narrow grooves is selected from the group consisting of glass, $SiO_2$, $Al_2O_3$ and barium titanate.

5. A head as set forth in claim 1, wherein said via hole portion is formed by a method selected from the group consisting of ionic etching and chemical etching.

6. A head as set forth in claim 1, wherein said coil is of a material selected from the group consisting of gold, copper, chromium and aluminum.

7. A head as set forth in claim 6, wherein said coil is a product of a vapor-phase film-forming process selected from the group consisting of sputtering and vacuum deposition.

8. A head as set forth in claim 1, wherein said laminate further includes a thick main pole film disposed between said interlayer insulating film and said main pole film, and said interlayer insulating film is of a material selected from the group consisting of $SiO_2$, $Al_2O_3$ and polyimide.

9. A head as set forth in claim 8, wherein said thick main pole film and said main pole film are of a material selected from the group consisting of Permalloy, Sendust, and amorphous cobalt alloys.

10. A head as set forth in claim 9, wherein said main pole films are each a product of a method selected from the group consisting of sputtering, vapor deposition and plating.

11. A head as set forth in claim 1, wherein said magnetic member comprises a substrate of a magnetic material selected from the group consisting of Ni-Zn and Mn-Zn ferrites.

12. A head as set forth in claim 11, wherein said substrate of a magnetic material is bonded to said substrate of a non-magnetic material with a layer of glass.

13. A head as set forth in claim 11, wherein said width of said narrow groove is larger by 0.5 to 50 microns than that of said main pole film.

14. A head as set forth in claim 13, wherein said width of said narrow groove is larger by 1 to 20 microns than that of said main pole film, and said narrow groove has a depth of 0.5 to 50 microns.

15. A head as set forth in claim 1, wherein said magnetic member comprises a thin film of a magnetic material selected from the group consisting of Permalloy, Sendust, and amorphous cobalt alloys, and Ni-Zn and Mn-Zn ferrites.

16. A head as set forth in claim 15, wherein said thin film of a magnetic material is a product of a vapor-phase film-forming process.

17. A head as set forth in claim 15, wherein said width of said narrow groove is larger by 0.5 to 50 microns than that of said main pole film, and said narrow groove has a depth of 0.5 to 30 microns.

18. A head as set forth in claim 17, wherein said width of said narrow groove is larger by 1 to 20 microns than that of said main pole film, and said depth is from one to five microns.

19. A head as set forth in claim 11 or 15, wherein said magnetic member is of Mn-Zn ferrite, and said laminate further includes an insulating layer disposed between said magnetic member and said coil.

* * * * *